Aug. 3, 1943.    J. F. WALLACE    2,325,895
CASTER WHEEL MOUNTING
Filed Feb. 9, 1942    3 Sheets-Sheet 1
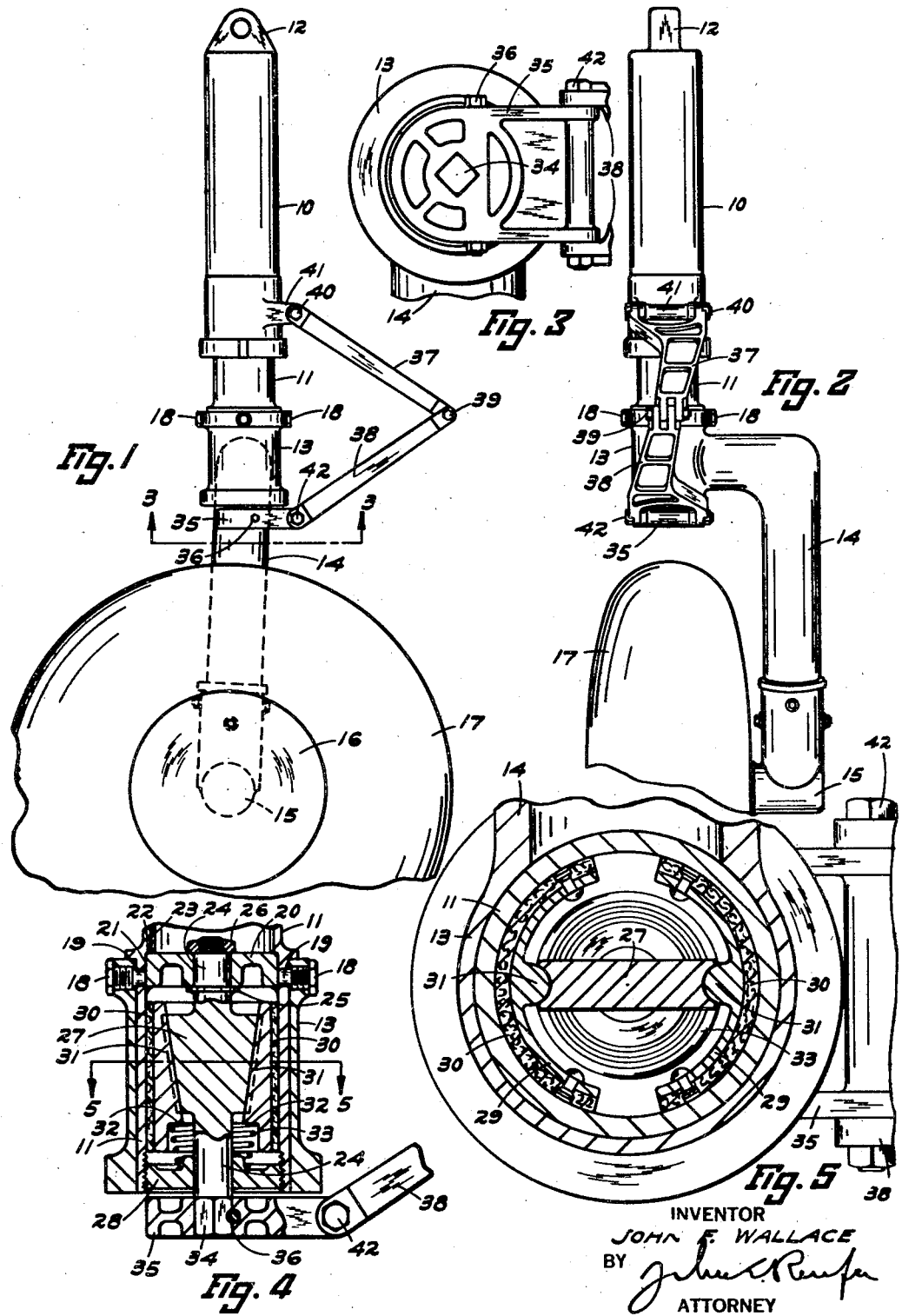
INVENTOR
JOHN F. WALLACE
BY
ATTORNEY

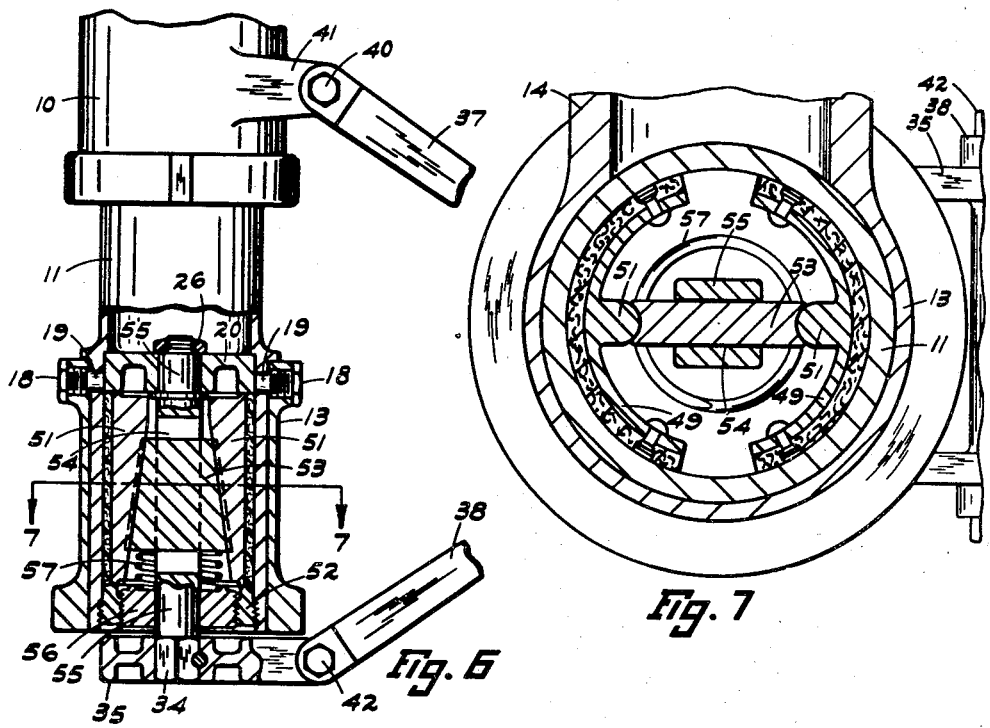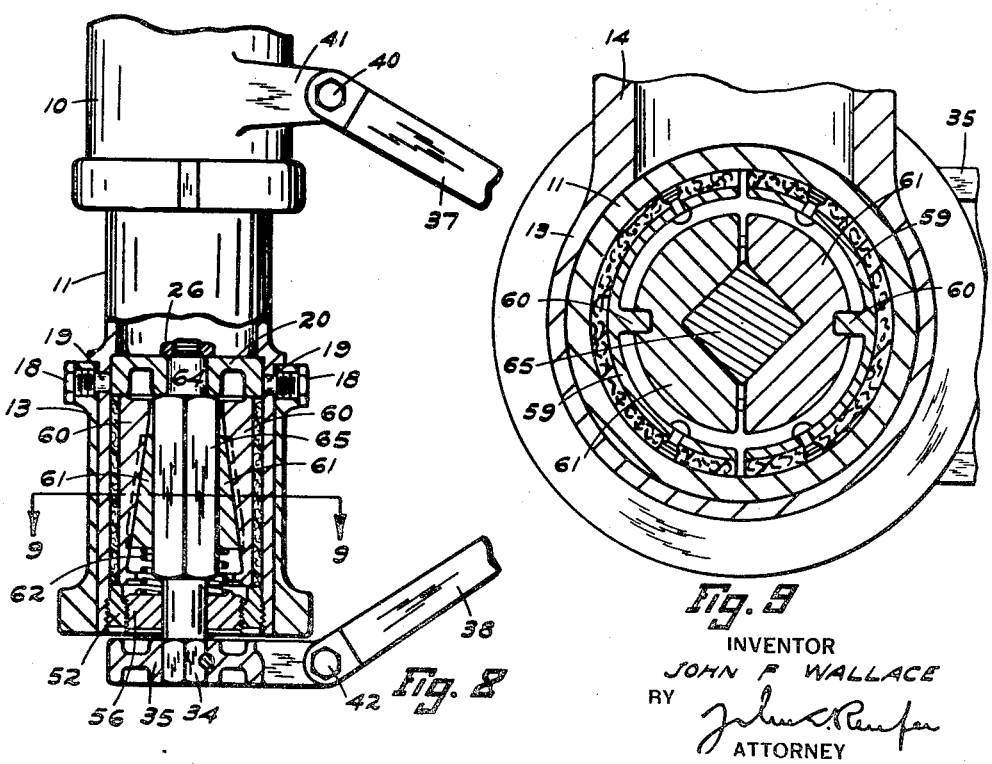

Aug. 3, 1943.  J. F. WALLACE  2,325,895
CASTER WHEEL MOUNTING
Filed Feb. 9, 1942  3 Sheets-Sheet 3
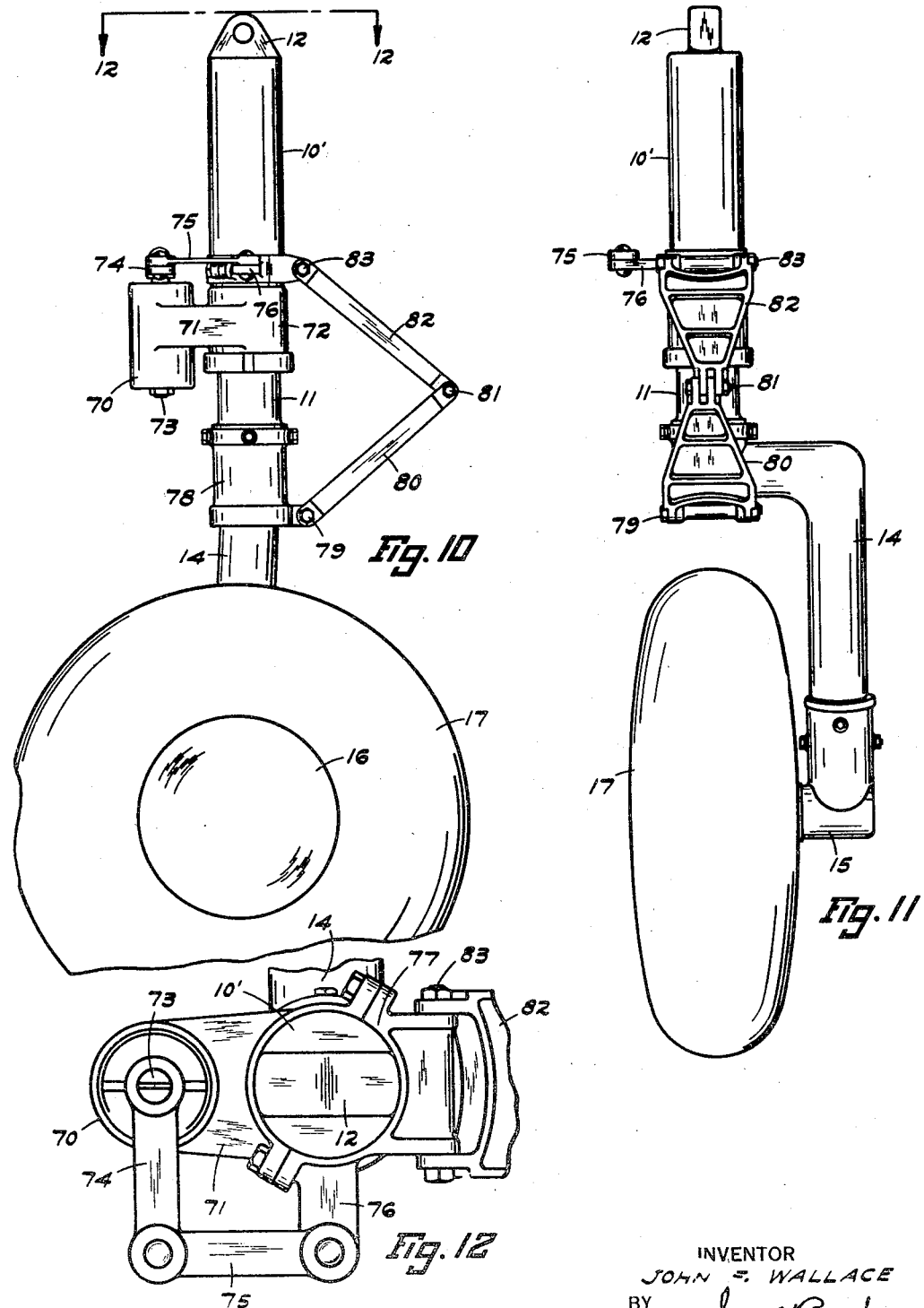
INVENTOR
JOHN F. WALLACE
BY
ATTORNEY Patented Aug. 3, 1943

2,325,895

UNITED STATES PATENT OFFICE 2,325,895

CASTER WHEEL MOUNTING

John F. Wallace, University Heights, Ohio, assignor to The Cleveland Pneumatic Tool Company, Cleveland, Ohio, a corporation of Ohio Application February 9, 1942, Serial No. 430,117

16 Claims. (Cl. 16—35)

This invention relates to improvements in caster wheel mountings, particularly mountings for nose wheels and tail wheels of airplanes. It is common practice to mount these wheels at the lower ends of shock absorbers that comprise generally a pair of telescoping cylinders the lower one of which is free to turn relative to the upper one. When such a wheel strikes an obstruction it tends to be deflected from its straight course, which in turn affects the steering of the airplane, and if small rotational impulses resulting from a series of obstructions were not snubbed considerable transverse vibration might result.

One of the objects of the present invention is the provision of means for snubbing the rotation of a caster wheel about its upright axis.

Another object is the provision of mechanical brake means for accomplishing the purpose stated.

A further object is the provision of wedge means working in an axial direction for forcing the brake shoes laterally outward into snubbing position.

Still another object is the provision of transversely acting cam surfaces functioning to increase snubbing pressure momentarily when sudden rotational impulses are imparted to the caster mounting.

Other objects and features of novelty will appear as I proceed with the description of those embodiments of the invention which, for the purposes of the present application, I have illustrated in the accompanying drawings, in which Fig. 1 is a side elevational view of a caster wheel mounting embodying the invention.

Fig. 2 is a front view of the same.

Fig. 3 is a bottom plan view on a larger scale of a portion of the mounting, this view looking in the direction of arrows 3—3 of Fig. 1.

Fig. 4 is a central sectional view on a larger scale of a fragment of the lower telescoping member, showing the snubbing apparatus mounted therein.

Fig. 5 is a cross-sectional view taken substantially on the line 5—5 of Fig. 4, but on a still larger scale.

Fig. 6 is an elevational view partly in central vertical section showing a modified form of the invention.

Fig. 7 is a transverse sectional view taken substantially on the line 7—7 of Fig. 6 but on a larger scale.

Fig. 8 is a view similar to Fig. 6 showing a further form of the invention.

Fig. 9 is a cross-sectional view on a larger scale taken substantially on the line 9—9 of Fig. 8.

Fig. 10 is a view similar to Fig. 1, showing another modification of the invention.

Fig. 11 is a front elevational view of the Figure 10 construction, and

Fig. 12 is a fragmental plan view on a larger scale, as indicated by the arrows 12—12 of Fig. 10.

Referring first to Figs. 1 to 5 inclusive of the drawings, 10 represents the upper cylindrical member and 11 the lower cylindrical member of a pair of telescoping shock absorber members forming a shock absorber or landing strut of a well known conventional type. These two members, except for the snubbing apparatus about to be described, are freely rotatable with respect to each other about their common axis. Suitable means such as a perforated ear 12 may be provided at the upper end of member 10 for convenience in connecting the shock absorber with an airplane.

Around the lower extremity of member 11 I fit a sleeve 13 which is formed integral with an angular caster arm or bracket 14 that extends down to and is rigidly connected with wheel spindle 15 upon which is mounted a wheel 16 carrying a pneumatic tire 17, the parts being so proportioned and arranged that the axis of the shock absorber normally stands within the central plane of the wheel slightly in advance of the axis of spindle 15.

Sleeve 13 is fastened in position upon cylindrical member 11 by means of a plurality of studs 18 that are threadably mounted in the sleeve and have smooth shanks 19 extending through registering holes in member 11. These shanks also bear at their ends against a plug or spider 20 that fits within an enlarged bore 21 of the cylindrical member 11 and up against a shoulder 22 formed at the junction of this bore with the smaller bore 23 of the member. This plug or spider 20 has a central opening forming a bearing for an axial stem 24. Below the spider 20 the stem 24 is provided with a collar 25, while above the spider 20 it has a threaded extension upon which is mounted a nut 26 that may be threaded down sufficiently so that in connection with the collar 25 the stem 24 is held against axial movement while free to turn. The studs 18 when threaded down tightly cause their shanks to firmly engage the periphery of spider 20 and hold it against the shoulder 22 as well as against relative rotation in the cylindrical member.

An intermediate portion of the stem 24 is extended laterally in opposite directions to form a wedge 27 with downwardly tapering surfaces.

Beyond the wedge the stem 24 is again circular in cross-section and this portion has bearing in the central opening of a plug 28 which is threaded into the lower extermity of a cylindrical member 11. Two metal brake shoes 29 provided on their outer surfaces with brake lining 30 are adapted to bear against the inner surface of cylindrical member 11. These brake shoes 29 have vertical ribs 31 which have tapered surfaces complemental to the tapered surfaces of wedge 27, and these engaging surfaces are arcuate in transverse section. In other words the interengaging tapered surfaces have interengaging transverse cam surfaces. Near the lower ends the ribs 31 are cut away to form shoulders 32 against which a coil spring 33 bears, the opposite end of spring 33 engaging plug 28 around a central boss thereof. The effective strength of spring 33 may be adjusted within limits by threading the plug 28 inwardly or outwardly. As will be obvious the spring 33 tends to force the ribs 31 and the shoes 29 upwardly, and the interengaging tapered surface of the wedge and the ribs 31 cause one component of this upward pressure to be exerted outwardly, thereby forcing the brake shoes against the cylindrical member 11 and snubbing any motion of rotation between that member and the stem 24.

The lower extremity of stem 24 projecting beyond the cylindrical member 11 and the sleeve 13 may be squared, as indicated at 34, to receive a crank arm 35, the latter being held in position on the squared stem by suitable means such as a bolt 36.

The upper cylindrical member 10 of the shock absorber is connected with the crank arm 35 by a pair of torque legs 37, 38 which are connected together by hinge 39. The outer end of leg 37 is connected by a pivot bolt 40 with a suitable boss 41 on the cylindrical member 10, while the outer end of leg 38 is connected by means of a pivot bolt 42 with the crank arm 35. Obviously therefore the stem 24 is maintained in the same angular relation with cylindrical member 10 regardless of the condition of compression or expansion of the shock absorber. Hence the snubbing of rotation as between the stem 24 and the cylindrical member 11 is equivalent to snubbing rotation between the two cylindrical members 10 and 11.

In operation, while the braking surfaces tend to prevent relative rotation between the two cylindrical members, the apparatus is adapted to yield sufficiently to prevent the strains which would arise were the two cylindrical members positively held against any relative rotation. Furthermore, when the wheel is sharply and suddenly deflected by an obstruction of considerable size the braking effect of the apparatus is momentarily increased because the ribs 31 then tend to move out of the grooved tapered surfaces of the wedge 27 which brings about a camming effect that forces the brake shoes more strongly outward against the cylindrical surface of member 11.

The form of the invention illustrated in Figs. 6 and 7 is similar to that of the first described form. In this case however the brake shoes 49, provided with brake lining 50, have ribs 51 which are inclined inwardly and upwardly, and the brake shoes are held against axial movement by engagement at their upper ends with the spider 20 and at their lower ends with a ring 52 which is threaded into the cylindrical member 11. The shoes therefore are free to move in and out but not to move axially. The ribs 51 are engaged by a wedge 53 which is also tapered upwardly and floats within a central slot 54 formed in an intermediate enlargement of the stem 55, the latter having cylindrical ends which fit within bearings in the spider 20 and in a plug 56 which is threadably mounted within the ring 52. A coil spring 57 bears at one end against the plug 56, which is adjustable, and at the other end against the bottom surface of wedge 53. The spring therefore acts through the wedge to exert pressure outwardly upon the ribs 51, thereby forcing the brake shoes against the inner surface of cylindrical member 11.

That form of the invention illustrated in Figs. 8 and 9 comprises a pair of brake shoes 59 with vertical ribs 60 which are inclined inwardly and upwardly like the ribs 51 of Figs. 6 and 7. These ribs are loosely received within grooves formed in the outer upwardly tapered walls of two wedge members 61 which are urged upwardly by a coil spring 62 that bears at its lower end against adjustable plug 56. The axial stem 64 which has rotational bearing in the spider 20 and the plug 56 has a somewhat enlarged intermediate portion 65 that is square in cross-section. The inner vertical surfaces of each of the wedge members 61 is grooved to receive two walls of the squared portion 65 of the stem. The operation is substantially the same in this case as in the case of the form illustrated in Figs. 6 and 7, except that there are two wedge elements instead of one and that the transverse camming action resulting from sudden sharp rotational impulses is exerted between the flat surfaces of the squared portion 65 of the stem and the complemental surfaces of the wedge elements 61. In this case the camming action is directly outward, whereas in the previous forms it is exerted in a direction perpendicular to the tapered surfaces.

The modification illustrated in Figs. 10, 11, and 12 differs from the previously described forms in the location of the snubbing apparatus. In this case it comprises a separate cylinder 70 which is rigidly attached to the lower end of shock absorber member 10', as by means of an arm 71 and a sleeve 72. Preferably the parts 70, 71 and 72 are cast or forged integral, and the sleeve 72 is secured against rotation upon the member 10'. So far as the apparatus within the cylinder 70 is concerned, it may correspond with that of any of the forms previously described, but in each case it is inverted, that is to say the stem 73 instead of projecting downwardly through the bottom of the cylinder projects upwardly through the top thereof and is there connected by suitable means with a crank arm 74. The outer end of this arm is pivotally connected with a link 75 which is also pivotally connected with another crank arm 76, the latter being rigid with one portion of a two-part bracket 77 which is rotatably mounted on the cylindrical member 10'. A sleeve 78 rigidly attached to the cylindrical member 11 carries a pivot bolt 79 upon which is mounted the outer end of the lower leg 80 of a pair of torque legs. A hinge 81 connects this leg with the upper leg 82 of the pair, and the latter leg at its upper end is connected by a pivot bolt 83 with the bracket 77. Impulses tending to rotate the two cylindrical members 10' and 11' relative to each other are transmitted from the member 10' directly to the cylinder 70 and from the member 11 through the torque legs, bracket 77, arm 76, link 75 and arm 74 to the stem 73, and the wedge means and brake shoes interposed between the stem 73 and the cylinder 70 act to snub the rotation.

Having thus described my invention, I claim:

1. In a caster wheel mounting, an upright member having a cylindrical surface, a stem projecting axially from said member, a brake shoe working against said cylindrical surface, a wedge operatively associated with said stem bearing against said shoe, the adjacent surfaces of said wedge and said brake shoe being tapered, and spring means cooperating with said wedge for exerting pressure to force said shoe against said cylindrical surface to snub relative rotation between said member and said stem.

2. In a caster wheel mounting, an upright member having a cylindrical surface, means tending to snub rotation of said member comprising an axially arranged stem, a brake shoe working against said cylindrical surface, wedge means associated with said stem and movable axially of said surface, the adjacent surfaces of said wedge and said brake shoe being tapered, and spring means cooperating with said wedge for exerting pressure to force said shoe into snubbing relation with said cylindrical surface.

3. In apparatus of the character described, a cylindrical member mounted to rotate about its axis, a stem axially arranged within said member, a crank arm at the outer end of said stem, wedge means associated with said stem, a brake shoe interposed between said wedge means and the inner surface of said cylindrical member, and spring means cooperating with said wedge means to force said brake shoe outwardly into snubbing relation with said cylindrical member.

4. In apparatus of the character described, a cylindrical member, a stem axially arranged within said member held at its inner end against axial movement, a rotation-controlling crank secured to the outer end of said stem, wedge means associated with said stem, a brake shoe interposed between said wedge means and the inner surface of said cylindrical member, and spring means cooperating with said wedge means to force said brake shoe outwardly into snubbing relation with said cylindrical member.

5. In apparatus of the character described, a pair of telescoping relatively rotatable members, a pair of torque legs hinged together, the outer end of one leg being attached to one of said telescoping members, and means at the outer end of the other leg for snubbing rotation of the other telescoping member, said last-named means comprising a brake shoe working against a cylindrical surface of the last-named telescoping member, and means comprising a spring and a wedge for exerting pressure to force said shoe into snubbing relation with said cylindrical surface.

6. In apparatus of the character described, a pair of telescoping relatively rotatable members, a pair of torque legs hinged together, the outer end of one leg being attached to one of said telescoping members, and means at the outer end of the other leg for snubbing rotation of the other telescoping member, said last-named means comprising a brake shoe working against a cylindrical surface of the last-named telescoping member, a wedge arranged axially of said cylindrical surface and operatively associated with said shoe, and spring means cooperating with said wedge for exerting pressure to force said shoe outwardly into snubbing relation with said cylindrical surface.

7. In apparatus of the character described, a cylindrical member, a stem axially mounted within said member and free to turn relative thereto, wedge means associated with said stem, a plurality of brake shoes interposed between said wedge means and said cylindrical member, the adjacent surfaces of said wedge means and said brake shoes being tapered in an axial direction, spring means cooperating with said tapered surfaces to force said brake shoes outwardly into snubbing relation with said cylindrical member, said apparatus including transversely acting cam surfaces functioning upon the transmission of sudden strong rotational impulses between said stem and said cylindrical member to temporarily increase the pressure of the brake shoes upon the said cylindrical member.

8. In apparatus of the character described, a cylindrical member, a stem axially mounted within said member and free to turn relative thereto, wedge means associated with said stem, a plurality of brake shoes interposed between said wedge means and said cylindrical member, the adjacent surfaces of said wedge means and said brake shoes being tapered in an axial direction, spring means cooperating with said tapered surfaces to force said brake shoes outwardly into snubbing relation with said cylindrical member, said tapered surfaces being cam shaped transversely, whereby sudden impulses tending to rotate said cylindrical member and said stem relative to each other temporarily increase the pressure of said brake shoes upon said cylindrical member.

9. In apparatus of the character described, an upright member having a cylindrical surface, means carried by said member for supporting a caster wheel in substantial alignment therewith, means tending to snub rotation of said member comprising an axially arranged stem, a brake shoe working against said cylindrical surface, wedge means associated with said stem and movable axially of said surface, and spring means cooperating with said wedge means for exerting pressure to force said shoe into snubbing relation with said cylindrical surface upon deflective movement of said caster wheel.

10. In apparatus of the character described, an upright member having a cylindrical surface, means carried by said member for supporting a caster wheel in substantial alignment therewith, a centrally apertured plug mounted within said member, means tending to snub rotation of said member comprising a stem arranged axially of said member and carried by said plug, a brake shoe working against said cylindrical surface, wedge means associated with said stem and movable axially of said surface, and spring means cooperating with said wedge means for exerting pressure to force said shoe into snubbing relation with said cylindrical surface upon deflective movement of said caster wheel.

11. In apparatus of the character described, an upright member having a cylindrical surface, means carried by said member for supporting a caster wheel in substantial alignment therewith, a centrally apertured plug mounted within said member, said plug being held against relative rotation by said means, means tending to snub rotation of said member comprising a stem arranged axially of said member and carried by said plug, a brake shoe working against said cylindrical surface, wedge means associated with said stem and movable axially of said surface, the adjacent surfaces of said wedge and brake shoe being tapered, and spring means cooperating with said wedge means to force said brake shoe outwardly into snubbing relation with said cylindrical surface upon deflective movement of said caster wheel.

12. In apparatus of the character described, upper and lower telescoping relatively rotatable members, a pair of torque legs hinged together, the outer end of one leg being attached to the upper telescoping member, means carried by the lower telescoping member for supporting a caster wheel in substantial alignment with said members, the other torque leg being attached to said means, means tending to snub rotation of said member comprising a brake shoe working against a cylindrical surface of the lower telescoping member, a wedge arranged axially of said cylindrical surface and operatively associated with said shoe, and spring means cooperating with said wedge for exerting pressure to force said shoe outwardly into snubbing relation with said cylindrical surface upon deflective movement of said caster wheel.

13. In apparatus of the character described, an upright member having a cylindrical surface, means tending to snub rotation of said member comprising an axially arranged stem, a brake shoe working against said cylindrical surface, wedge means associated with said stem and movable axially of said surface, the adjacent surfaces of said wedge and said brake shoe being tapered outwardly and downwardly, and spring means cooperating with said wedge for exerting pressure to force said shoe into snubbing relation with said cylindrical surface.

14. In apparatus of the character described, an upright member having a cylindrical surface, means tending to snub rotation of said member comprising an axially arranged stem, a brake shoe working against said cylindrical surface, wedge means associated with said stem and movable axially of said surface, the adjacent surfaces of said wedge and said brake shoe being tapered inwardly and upwardly, and spring means cooperating with said wedge for exerting pressure to force said shoe against said cylindrical surface to snub relative rotation between said members and said stem.

15. In a caster wheel mounting, an upright member having a cylindrical surface, means tending to snub rotation of said member comprising an axially arranged stem, a brake shoe working against said cylindrical surface, a wedge carried by said stem and movable axially relative thereto, the adjacent surfaces of said wedge and said brake shoe being tapered inwardly and upwardly, and spring means cooperating with said wedge for exerting pressure to force said shoe against said cylindrical surface to snub relative rotation between said member and said stem.

16. In a caster wheel mounting, an upright member having a cylindrical surface, a stem projecting axially from said member, a brake shoe working against said cylindrical surface, said brake shoe being formed with inwardly and upwardly tapering ribs, a pair of wedges mounted intermediate of said stem and having outer upwardly tapered walls adapted to be moved axially of said surface, said tapered walls being formed with grooves for receiving said ribs, and spring means cooperating with said wedge for exerting pressure to force said shoe into snubbing relation with said cylindrical surface.

JOHN F. WALLACE.